United States Patent
Ookoba

(10) Patent No.: US 12,208,054 B2
(45) Date of Patent: Jan. 28, 2025

(54) LOAD REDUCTION DEVICE, LOAD REDUCTION METHOD, AND STORAGE MEDIUM STORING PROGRAM

(71) Applicant: NEC Corporation, Tokyo (JP)

(72) Inventor: Tadashi Ookoba, Tokyo (JP)

(73) Assignee: NEC CORPORATION, Tokyo (JP)

( * ) Notice: Subject to any disclaimer, the term of this patent is extended or adjusted under 35 U.S.C. 154(b) by 916 days.

(21) Appl. No.: 17/292,765

(22) PCT Filed: Nov. 14, 2019

(86) PCT No.: PCT/JP2019/044635
§ 371 (c)(1),
(2) Date: May 11, 2021

(87) PCT Pub. No.: WO2020/100961
PCT Pub. Date: May 22, 2020

(65) Prior Publication Data
US 2021/0393467 A1 Dec. 23, 2021

(30) Foreign Application Priority Data

Nov. 16, 2018 (JP) .................................. 2018-215838
Aug. 21, 2019 (JP) .................................. 2019-151162

(51) Int. Cl.
*A61H 3/00* (2006.01)
*B25J 9/00* (2006.01)

(52) U.S. Cl.
CPC .............. *A61H 3/00* (2013.01); *B25J 9/0006* (2013.01); *A61H 2003/007* (2013.01);
(Continued)

(58) Field of Classification Search
CPC ................ A61H 3/00; A61H 2003/007; A61H 2201/1642; A61H 2201/1652;
(Continued)

(56) References Cited

U.S. PATENT DOCUMENTS 10,307,272 B2 * 6/2019 Herr .......................... A61F 2/76
2004/0249316 A1   12/2004 Ashihara et al.
(Continued)

FOREIGN PATENT DOCUMENTS

CN  104622669 A  5/2015
CN  107921631 A  4/2018
(Continued)

OTHER PUBLICATIONS

James J. Abbas, Neural Network Control of Functional Neuromuscular Stimulation Systems : Computer Simulation Studies, 1995, IEEE, 1117-1127 (Year: 1995).*
(Continued)

*Primary Examiner* — Bickey Dhakal

(57) ABSTRACT

A load reduction device includes a determination unit configured to determine a repeated motion that is repeated by a user; and a torque control unit configured to control, by comparing a characteristic extracted on the basis of machine learning for repeated motions and a reference model, torque output by a drive mechanism to reduce a load on the user at a joint of a leg of the user.

8 Claims, 10 Drawing Sheets

(52) U.S. Cl.
CPC ........... *A61H 2201/1642* (2013.01); *A61H 2201/1652* (2013.01); *A61H 2201/501* (2013.01); *A61H 2201/5069* (2013.01); *A61H 2201/5071* (2013.01); *A61H 2201/5084* (2013.01)

(58) Field of Classification Search
CPC ...... A61H 2201/501; A61H 2201/5069; A61H 2201/5071; A61H 2201/5084; B25J 9/0006; B25J 9/163; B25J 9/1633; G05B 2219/40305; G05B 19/042
See application file for complete search history.

(56) References Cited

U.S. PATENT DOCUMENTS

| | | | |
|---|---|---|---|
| 2013/0102934 | A1 | 4/2013 | Ikeuchi |
| 2014/0221894 | A1* | 8/2014 | Nagasaka ............ B25J 9/0006 602/23 |
| 2015/0127018 | A1 | 5/2015 | Lim et al. |
| 2015/0265428 | A1 | 9/2015 | Akiba |
| 2016/0074272 | A1 | 3/2016 | Ahn et al. |
| 2016/0143800 | A1* | 5/2016 | Hyung ................ A61H 1/0244 623/32 |
| 2017/0202724 | A1 | 7/2017 | De Rossi et al. |
| 2017/0252255 | A1 | 9/2017 | Asano et al. |
| 2018/0008502 | A1 | 1/2018 | Asbeck et al. |

FOREIGN PATENT DOCUMENTS

| | | |
|---|---|---|
| JP | 2003-116893 A | 4/2003 |
| JP | 2013-090693 A | 5/2013 |
| JP | 2015-089510 A | 5/2015 |
| JP | 2015-177863 A | 10/2015 |
| JP | 2016-059795 A | 4/2016 |
| JP | 2016-539723 A | 12/2016 |
| JP | 2017-529161 A | 10/2017 |
| WO | 2015/088863 A2 | 6/2015 |
| WO | 2016/038824 A1 | 3/2016 |

OTHER PUBLICATIONS

International Search Report for PCT Application No. PCT/JP2019/044635, mailed on Jan. 14, 2020.
CN Office Action for CN Application No. 201980074217.8, mailed on Jul. 19, 2024 with English Translation.

* cited by examiner

LOAD REDUCTION DEVICE, LOAD REDUCTION METHOD, AND STORAGE MEDIUM STORING PROGRAM

This application is a National Stage Entry of PCT/JP2019/044635 filed on Nov. 14, 2019, which claims priority from Japanese Patent Application 2018-215838 filed on Nov. 16, 2018 and Japanese Patent Application 2019-151162 filed on Aug. 21, 2019, the contents of all of which are incorporated herein by reference, in their entirety.

TECHNICAL FIELD

The present invention relates to a load reduction device, a load reduction method, and a storage medium storing a program.

BACKGROUND ART

There is known a load reduction device that performs assistance of a load such as a walking motion of a user and mitigates the load of luggage carried by the user, when worn by the user. The load reduction device is sometimes called a powered suit when wearable by a person.

Patent Document 1 discloses a technique of identifying at least one predefined gait event using the output of at least one sensor, adjusting the actuation profile of at least one actuator, and the actuation profile of the at least one actuator generating a beneficial moment about at least one joint.

Patent Document 2 discloses a technique of sensing the motion of at least one joint or measuring the motion of at least one joint, determining the motion state of at least one joint based on the sensed or measured motion of the at least one joint, and controlling a walking assist robot on the basis of the determination result regarding the operating state of the at least one joint.

Patent Document 3 discloses a technique of acquiring a state signal indicating the movement of the upper limbs of the user and determining an auxiliary timing which is a timing of assisting the user's action from a change in the state signal.

Patent Document 4 discloses a technique for determining the drive amount of an actuator according to a sensor value when a pedestrian walks according to a walking algorithm for determining the drive amount of the actuator that drives the joint of the walking support device. Patent Document 4 discloses that this walking algorithm is information generated by statistically processing walking data showing the characteristics of walking.

CITATION LIST

Patent Literature

[Patent Document 1] Published Japanese Translation No. 2016-539723 of the PCT International Publication.
[Patent Document 2] Japanese Unexamined Patent Application Publication No. 2015-089510
[Patent Document 3] Japanese Unexamined Patent Application Publication No. 2015-177863
[Patent Document 4] WO 2016/038824

SUMMARY OF THE INVENTION

Problems to be Solved by the Invention

While the torque that is output by the load reduction device required for load reduction varies sequentially according to the momentum of the user's motion, it is desired to perform more appropriate load reduction for the user's motion.

Therefore, an example object of the present invention is to provide a load reduction device, a load reduction method, and a storage medium for storing a program therein that can solve the above-mentioned problems.

Means for Solving the Problems

According to a first aspect of the present invention, a load reduction device includes a determination unit configured to determine a repeated motion that is repeated by a user; and a torque control unit configured to control, by comparing a characteristic extracted on the basis of machine learning for repeated motions and a reference model, torque output by a drive mechanism to reduce a load on the user at a joint of a leg of the user.

According to a second aspect of the present invention, a load reduction method includes determining a repeated motion that is repeated by a user; and controlling, by comparing a characteristic extracted on the basis of machine learning for repeated motions and a reference model, torque output by a drive mechanism to reduce a load on the user at a joint of a leg of the user.

According to a third aspect of the present invention, a program stored in a storage medium causes a computer of a load reduction device to execute processes, the processes includes: determining a repeated motion that is repeated by a user; and controlling, by comparing a characteristic extracted on the basis of machine learning for repeated motions and a reference model, torque output by a drive mechanism to reduce a load on the user at a joint of a leg of the user.

Advantageous Effects of Invention

According to the present invention, it is possible to provide a load reduction device capable of more appropriate load reduction for the user's motions.

EXAMPLE EMBODIMENT

Hereinbelow, a load reduction device according to an embodiment of the present invention, a load reduction method, and a storage medium for storing a program therein will be described with reference to the drawings.

Figure 1:
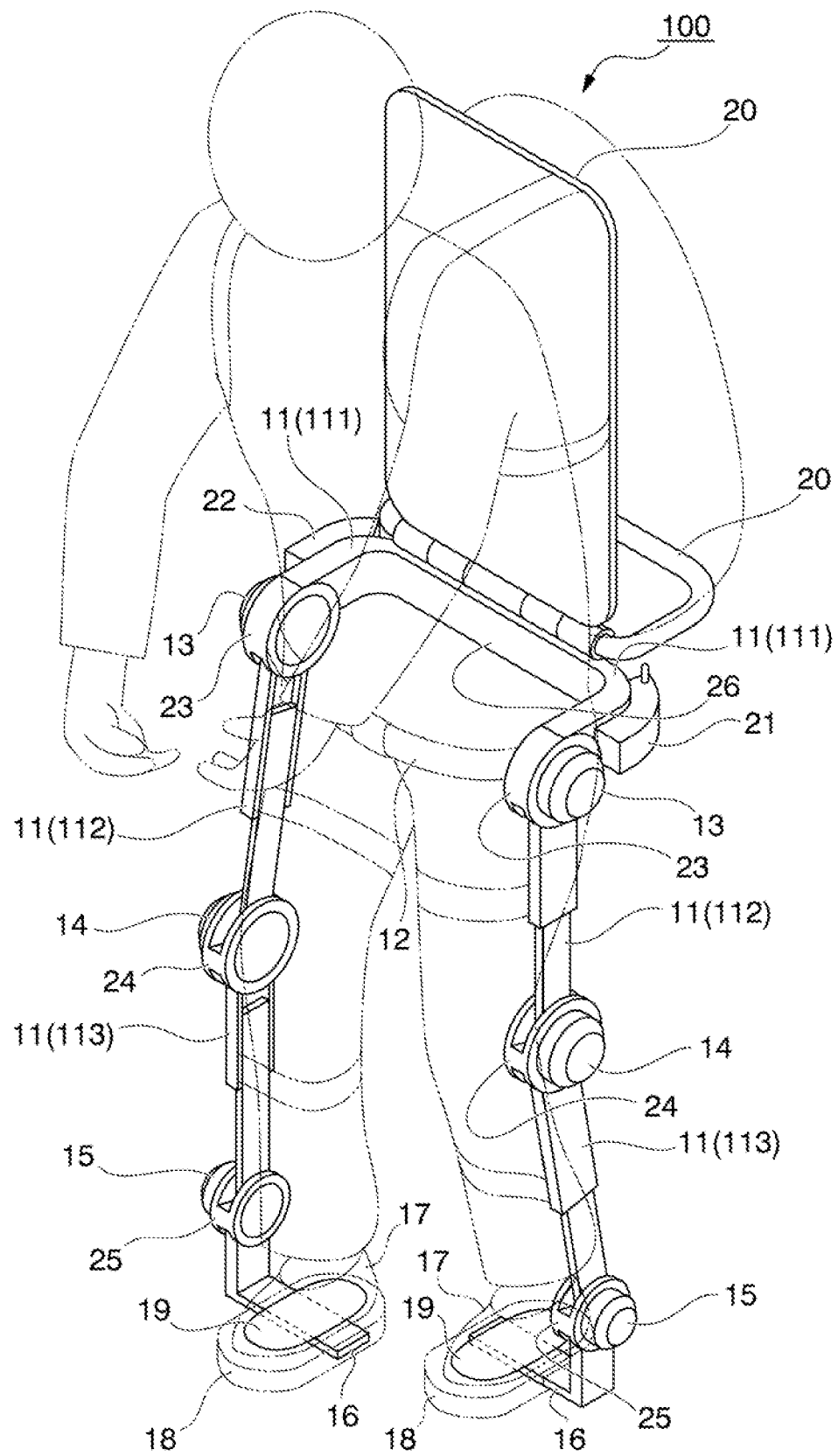
FIG. 1 is a perspective view showing a configuration of a powered suit according to an embodiment of the present invention.

FIG. 1 is a perspective view showing a configuration of a powered suit according to the present embodiment.

A powered suit 100 is one aspect of the load reduction device. The powered suit 100 is constituted by a skeleton portion 11, a belt 12, a hip actuator 13, a knee actuator 14, an ankle actuator 15, a shoe sole plate 16, a foot harness 17, a shoe sole load sensor 18, a foot sole load sensor 19, a loading platform 20, a control device 21, a battery 22, a hip joint sensor 23, a knee joint sensor 24, an ankle joint sensor 25, an acceleration sensor 26, and the like. The skeleton portion 11 is roughly classified into a first skeleton portion 111, a second skeleton portion 112, and a third skeleton portion 113 as an example.

As shown in FIG. 1, the powered suit 100 is configured as follows so as to support the loading platform 20, which is one aspect of the mechanism for holding luggage as an example. That is, the powered suit 100 is provided with the first skeleton portion 111, and the left and right hip actuators 13 are coupled rotatable to the first skeleton portion 111 and the second skeleton portion 112, which corresponds to the left or right thigh portion of the user wearing the powered suit 100, respectively. The left and right knee actuators 14 couple rotatable the corresponding second skeleton portion 112 on the left or right side and the corresponding third skeleton portion 113 along the left or right lower leg portion of the user wearing the powered suit 100. The ankle actuators 15 couple rotatable to the corresponding third skeleton portion 113, and the left or right side to a corresponding shoe sole plate 16 provided on the back of the foot harness 17 on the left or right side of the user wearing the powered suit 100. The actuators 13, 14 and 15 are drive mechanisms that output torque that mitigates loads exerted to the user at each joint of each leg of the user.

The user who wears the powered suit 100 attaches his/her left and right feet to the corresponding foot harnesses 17, and fixes the first skeleton portion 111 to the waist with the belt 12 so that the first skeleton portion 111 is closely attached to the waist. The powered suit 100 has a structure in which most of the load of the luggage and the load of the powered suit 100 is released to the ground surface in contact with the soles of the feet via the skeleton portion 11 and the hip actuator 13, the knee actuator 14, and the ankle actuator 15. The user turns on the control device 21 of the powered suit 100. The control device 21 controls the hip actuator 13, the knee actuator 14, and the ankle actuator 15 so as to transmit as much of the device weight as possible, which is the sum of the load of the luggage loaded on the loading platform 20 and the weight of the powered suit 100, to the walking surface via the skeleton portion 11 and the hip actuator 13, the knee actuator 14, and the ankle actuator 15. Thereby, the powered suit 100 mitigates the burden such as the load of the luggage on the user who wears the powered suit 100, loads the luggage on the loading platform 20, and walks.

The hip joint sensor 23 is installed in the hip actuator 13, and detects the hip joint angle, that is, the angle formed between the first skeleton portion 111 and the second skeleton portion 112, by an encoder. The knee joint sensor 24 is installed in the knee actuator 14, and detects the knee joint angle, that is, the angle between the second skeleton portion 112 and the third skeleton portion 113, by the encoder. The ankle joint sensor 25 is installed in the ankle actuator 15, and detects the ankle joint angle, that is, the angle between the third skeleton portion 113 and the shoe sole plate 16, by the encoder. The hip joint sensor 23, the knee joint sensor 24, and the ankle joint sensor 25 detect the angle of each joint of each leg of the user (hereinafter referred to as the "joint angle"). The acceleration sensor 26 detects the acceleration of the user's lower limbs.

The shoe sole load sensor 18 is provided on the bottom of the foot harness 17 corresponding to the shoe worn by the user. Further, the shoe sole load sensor 18 is provided on the ground contact surface side of the shoe sole plate 16 that transmits the weight of the powered suit 100 and luggage to the ground contact surface, and the foot harness 17 that transmits the user's weight to the ground contact surface so as to cover the entire back surface of the shoe sole plate 16 and the foot harness 17. The foot sole load sensor 19 is provided in the foot harness 17 so as to cover the entire sole surface so that the weight thereof can be measured from the sole of the user. For example, the foot sole load sensor 19 may be provided between the insole of the foot harness 17 and the shoe sole plate 16, or may be provided on the upper portion of the shoe sole plate 16.

As an example, the shoe sole load sensor 18 and the foot sole load sensor 19 are sensors in which electrodes are arranged in a matrix on the front and back of a thin sheet-like insulator. The shoe sole load sensor 18 and the foot sole load sensor 19 measure the electrical resistance of the lattice points of the electrodes, and output the measured values to the control device 21. The control device 21 calculates the pressure applied to each lattice point and the load on the entire surface of the sensor sheet based on the electrical resistance value of each lattice point.

Figure 2:
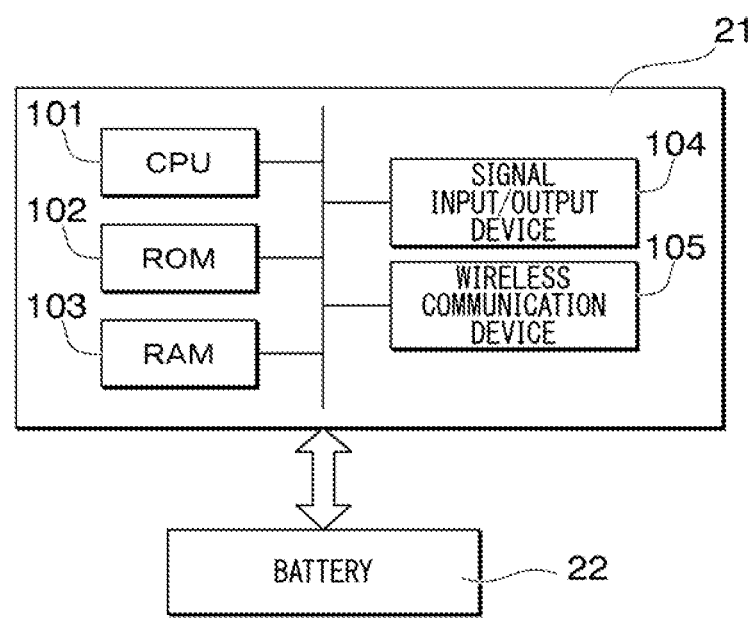
FIG. 2 is a diagram showing a hardware configuration of a control device according to an embodiment of the present invention.

FIG. 2 is a diagram showing the hardware configuration of the control device.

As shown in this figure, the control device 21 is a computer provided with hardware such as a CPU (Central Processing Unit) 101, a ROM (Read Only Memory) 102, a RAM (Random Access Memory) 103, a signal input/output device 104, and a wireless communication device 105.

The signal input/output device 104 inputs signals output from the shoe sole load sensor 18, the foot sole load sensor 19, the hip joint sensor 23, the knee joint sensor 24, the ankle joint sensor 25 and the acceleration sensor 26. The signal input/output device 104 outputs control signals for controlling the hip actuator 13, the knee actuator 14, and the ankle actuator 15. The control device 21 operates by power supplied from the battery 22.

The wireless communication device 105 is communicatively connected with another device.

Figure 3:
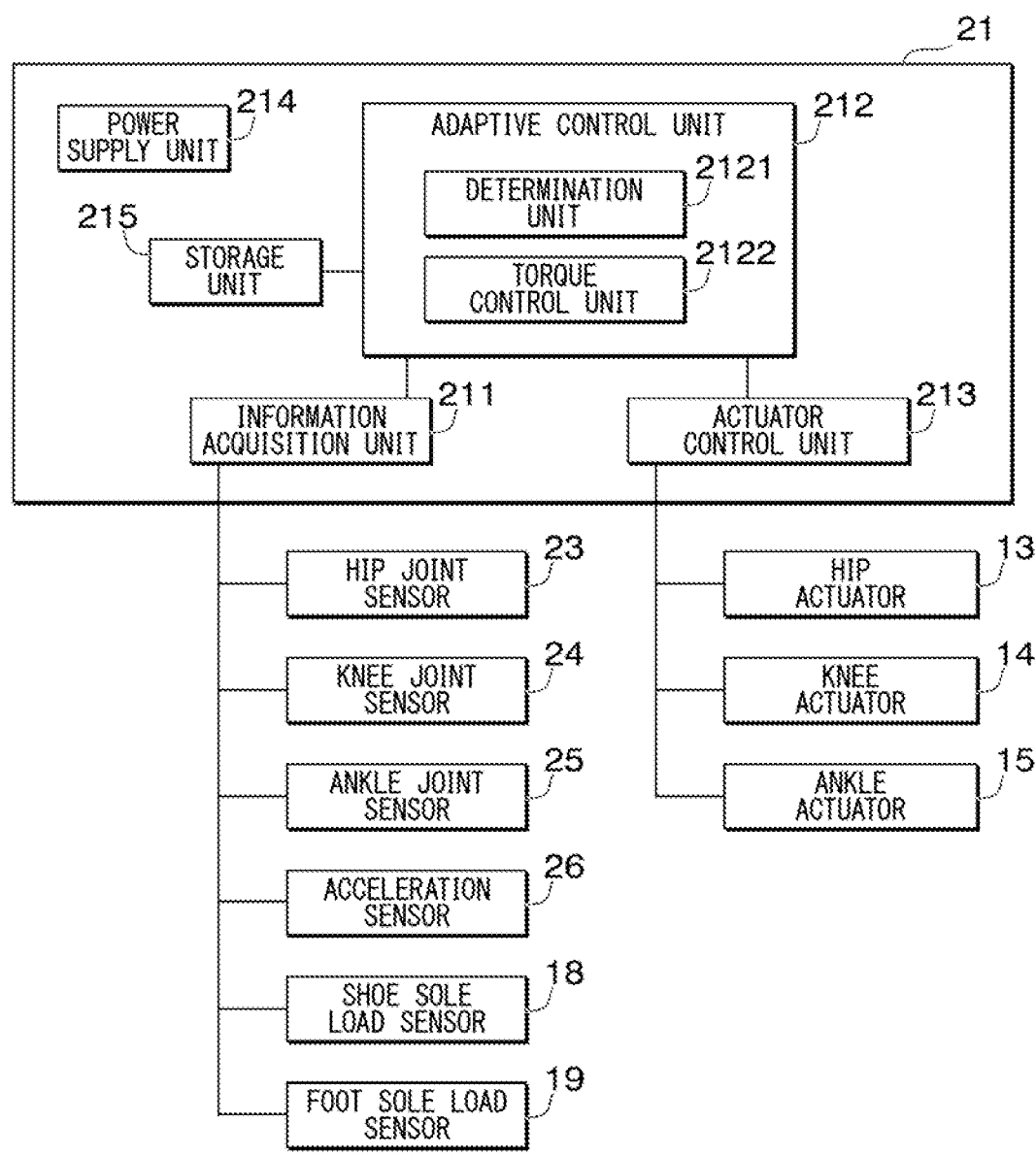
FIG. 3 is a function block diagram of a control device according to an embodiment of the present invention.

FIG. 3 is a function block diagram of the control device.

The control device 21 is activated based on the power supplied from the battery 22 by turning on the power button. The control device 21 executes the control program after startup. As a result, the control device 21 is provided with at least an information acquisition unit 211, an adaptive control unit 212, an actuator control unit 213, a power supply unit 214, and a storage unit 215.

The information acquisition unit 211 acquires sensing information from the shoe sole load sensor 18, the foot sole load sensor 19, the hip joint sensor 23, the knee joint sensor 24, the ankle joint sensor 25 and the acceleration sensor 26. The sensing information of the shoe sole load sensor 18 and the foot sole load sensor 19 is load information indicating the detected load value. The sensing information of the hip joint sensor 23, the knee joint sensor 24, and the ankle joint sensor 25 is joint angle information indicating the detected joint angle. The sensing information of the acceleration sensor 26 is acceleration information that indicates the detected acceleration.

The actuator control unit 213 controls the hip actuator 13, the knee actuator 14, and the ankle actuator 15.

When the power button is turned on, the power supply unit 214 supplies electric power from the battery 22 to each part of the control device 21.

The adaptive control unit 212 is provided with a determination unit 2121 and a torque control unit 2122.

The determination unit 2121 determines a repeated motion of the user on the basis of the acceleration detected by the acceleration sensor 26, the joint angle detected by the hip joint sensor 23, the knee joint sensor 24, and the ankle joint sensor 25, or the load value detected by the shoe sole load sensor 18 or the foot sole load sensor 19. For example, the repeated motion is a gait cycle in which one period is from the start to the end of one step.

The torque control unit 2122 compares a characteristic extracted on the basis of machine learning of repeated motions over a plurality of periods (hereinafter referred to as multiple periods) with a reference model of each motion. As a result, the torque control unit 2122 controls the output torque output by the hip actuator 13, the knee actuator 14, and the ankle actuator 15. Examples of a characteristic include the timing of heel strike, the timing of toe off, and the peak point of each joint torque. The heel strike is when the heel has landed. The toe off is when the toe has separated from the ground. The peak point of each joint torque is the peak time and the output value of the output torque output by the hip actuator 13, the knee actuator 14, and the ankle actuator 15, respectively.

The storage unit 215 stores a reference model corresponding to each motion having different momentum such as walking and running. The reference model is a model for determining the control pattern of the output torque output by the hip actuator 13, the knee actuator 14, and the ankle actuator 15 based on the characteristics corresponding to each motion. The control pattern is determined by parameters used to calculate the output torque and the like. The parameters include, for example, control system parameters for determining the response of the hip actuator 13, the knee actuator 14, and the ankle actuator 15, and a threshold value for determining a stance or swing.

For example, the reference model corresponding to walking is data held in association with characteristics corresponding to walking with parameter setting values for walking and an algorithm for walking. Further, the reference model corresponding to running is data held in association with the characteristics corresponding to running with the parameter setting values for running and an algorithm for running.

Note that the storage unit 215 may store a reference model corresponding to other motions other than walking and running. The reference model may be one according to the walking speed and the running speed. Further, the storage unit 215 stores an angle reference at each joint of each leg.

First Embodiment

Next, the operation of the control device 21 according to the first embodiment will be described in detail.

Figure 4:
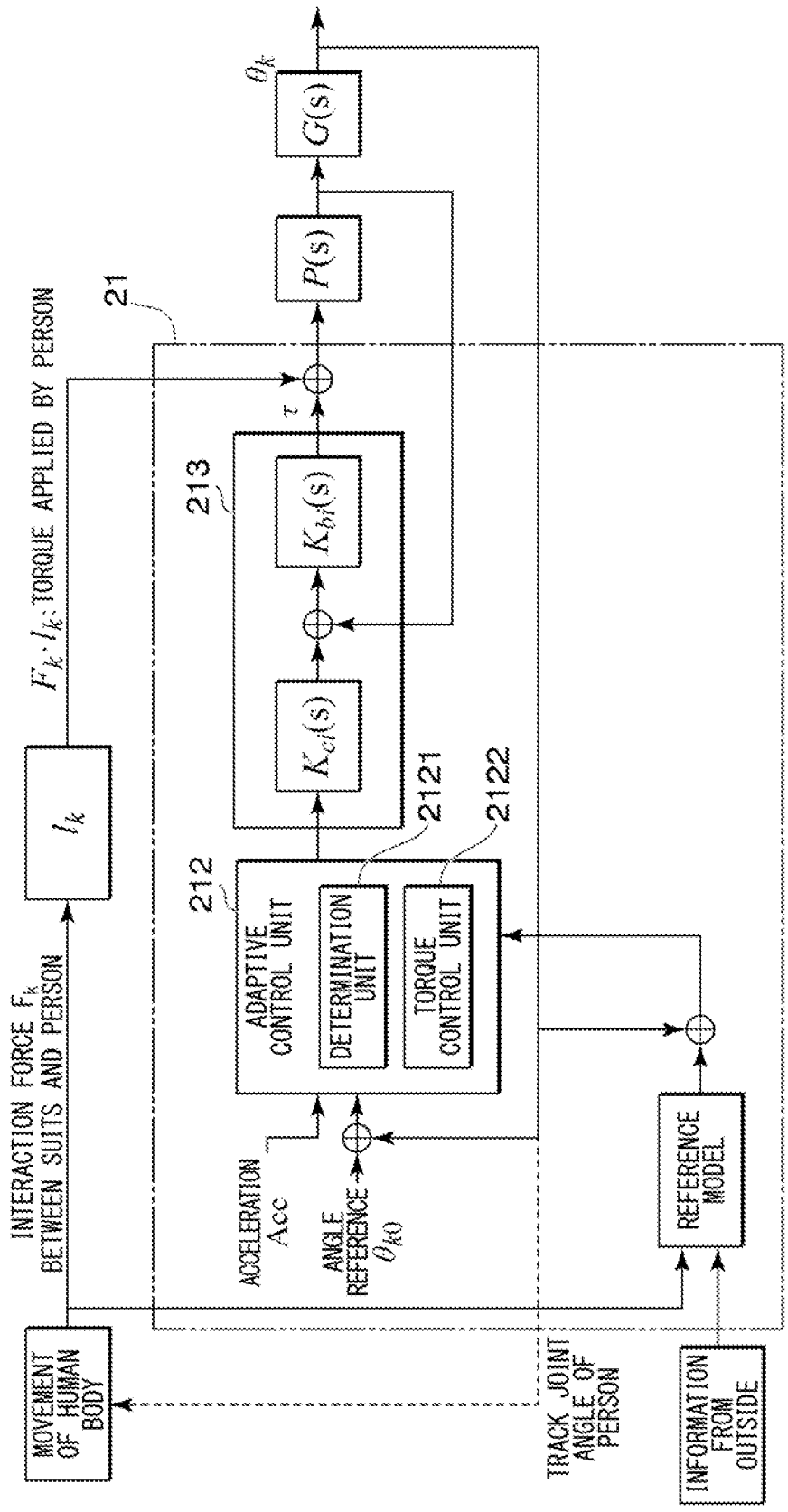
FIG. 4 is an operation block diagram showing the operation of the control device according to the first embodiment.

FIG. 4 is an operation block diagram showing the operation of the control device according to the first embodiment.

First, the adaptive control unit 212 controls the output torque output by the hip actuator 13, the knee actuator 14, and the ankle actuator 15 of each leg. The adaptive control unit 212 controls each output torque on the basis of the load values detected by the shoe sole load sensor 18 and the foot sole load sensor 19, the acceleration Acc detected by the acceleration sensor 26, each joint angle $\theta_k$ detected by each of the hip joint sensor 23, the knee joint sensor 24, and the ankle joint sensor 25, the angle reference $\theta_{k0}$, and the reference model stored by the storage unit 215.

More specifically, first, the determination unit 2121 determines the repeated motion of the user. A gait cycle is an example of a repeated motion.

Figure 5:
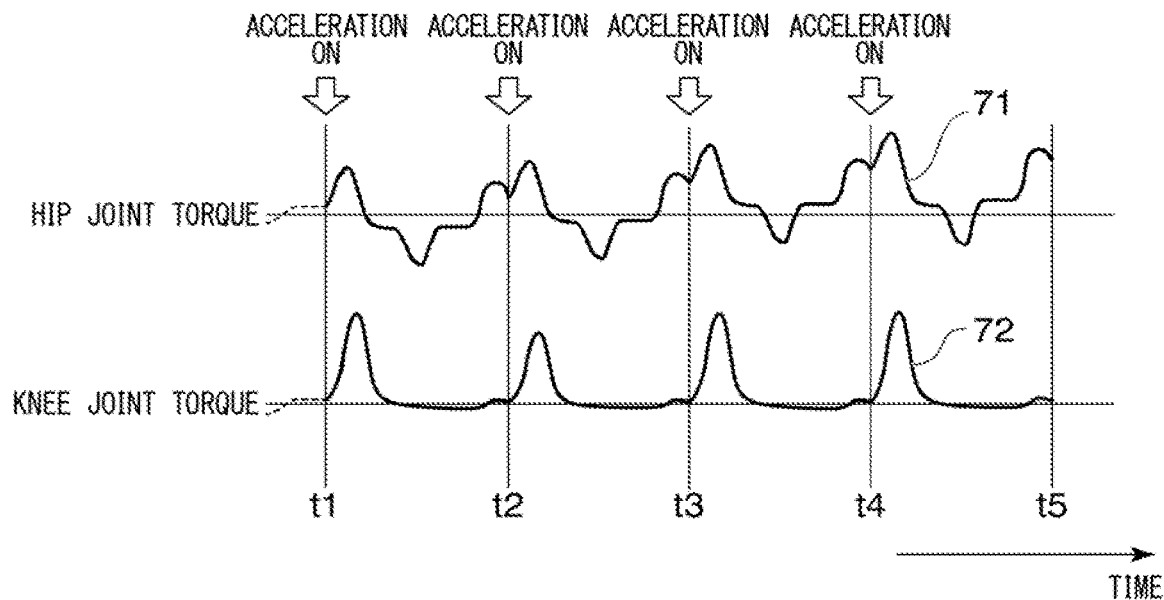
FIG. 5 is a graph for explaining a method for determining a gait cycle according to an embodiment of the present invention.

FIG. 5 is a graph for explaining a method of determining the gait cycle.

The horizontal axis of the graph shown in this figure indicates time. The vertical axis of the graph shown in this figure represents the magnitude of torque. The solid line 71 shown in the upper row shows an example of the transition of the hip joint torque. The hip joint torque is the output torque output by the hip actuator 13. The solid line 72 shown in the lower row shows an example of the transition of the knee joint torque. The knee joint torque is the output torque output by the knee actuator 14. In addition, the ankle actuator 15 outputs ankle joint torque. Similar to the hip joint torque and the knee joint torque, the value of the ankle joint torque also increases or decreases in a time period according to the walking motion of the user.

Further, "Acceleration ON" indicates that the acceleration detected by the acceleration sensor 26 is equal to or greater than a predetermined threshold value. In the illustrated example, the acceleration is equal to or greater than a predetermined threshold value at times t1, t2, t3, t4, t5.

The determination unit 2121 determines when the acceleration exceeds a predetermined threshold value, as the stance timing by one foot after the landing of one foot in the gait cycle from the start to the end of the walking step. Then, the determination unit 2121 determines one stance timing to the next stance timing of a foot to be one period of the gait cycle.

In the example shown in FIG. 5, the determination unit 2121 makes the duration from time t1, when the acceleration indicated by the acceleration sensor 26 has become equal to or greater than a predetermined threshold value indicating the start of the gait cycle, to time t2, when the acceleration has become equal to or greater than a predetermined threshold value, one period. Similarly, the determination unit 2121 sets the duration from time t2 to time t3 as the next period, sets the duration from time t3 to time t4 as the next period, and sets the duration from time t4 to time t5 as the next period.

The determination unit 2121 outputs the gait cycle data for the latest N (N being an integer of 2 or more) periods to the torque control unit 2122. For example, the determination unit 2121 outputs the gait cycle data for several steps to the torque control unit 2122. The gait cycle data is transition data in the gait cycle for one period (step). The transition data shows the transition of each joint angle, the transition of each load value, and the transition of the output torque output by the hip actuator 13, the knee actuator 14, and the ankle actuator 15, in the gait cycle.

In this example, the determination unit 2121 makes a determination of a repeated motion on the basis of the acceleration detected by the acceleration sensor 26, but the present invention is not thereto. The determination unit 2121 may determine a repeated motion based on the joint angles detected by the hip joint sensor 23, the knee joint sensor 24, and the ankle joint sensor 25. The torque control unit 2122 executes torque control processing on the basis of the gait cycle data (for N steps) over multiple periods.

Figure 6:
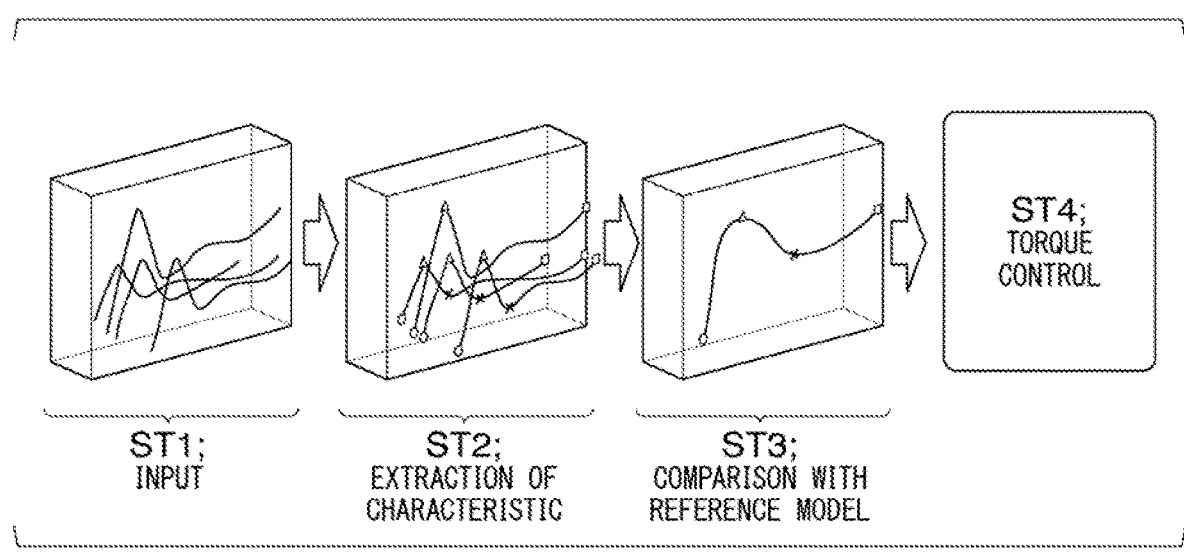
FIG. 6 is a diagram showing an outline of torque control processing according to an embodiment of the present invention.

FIG. 6 is a diagram showing an outline of torque control processing.

The torque control unit 2122 inputs the gait cycle data of for each 1 step (Step ST1). The torque control unit 2122 performs machine learning such as convolution processing and weighting processing on the input gait cycle data using a characteristic extraction model based on a convolutional neural network, and extracts characteristics in the gait cycle (Step ST2).

Examples of a characteristic include the timing of heel strike, the timing of toe off, and the peak point of joint torque. The torque control unit 2122 determines heel strike and toe off on the basis of the transition of the load value detected by the shoe sole load sensor 18 or the foot sole load sensor 19, or the transition of the joint angle detected by the hip joint sensor 23, the knee joint sensor 24, and the ankle joint sensor 25. For example, the torque control unit 2122 determines that the heel has landed when the load value exceeds the first threshold value. Further, the torque control unit 2122 determines that the toes have separated when the load value becomes equal to or less than the second threshold value. Further, the torque control unit 2122 determines the peak point of each joint torque on the basis of the transition of the output torque output by the hip actuator 13, the knee actuator 14, and the ankle actuator 15.

Figure 7A:
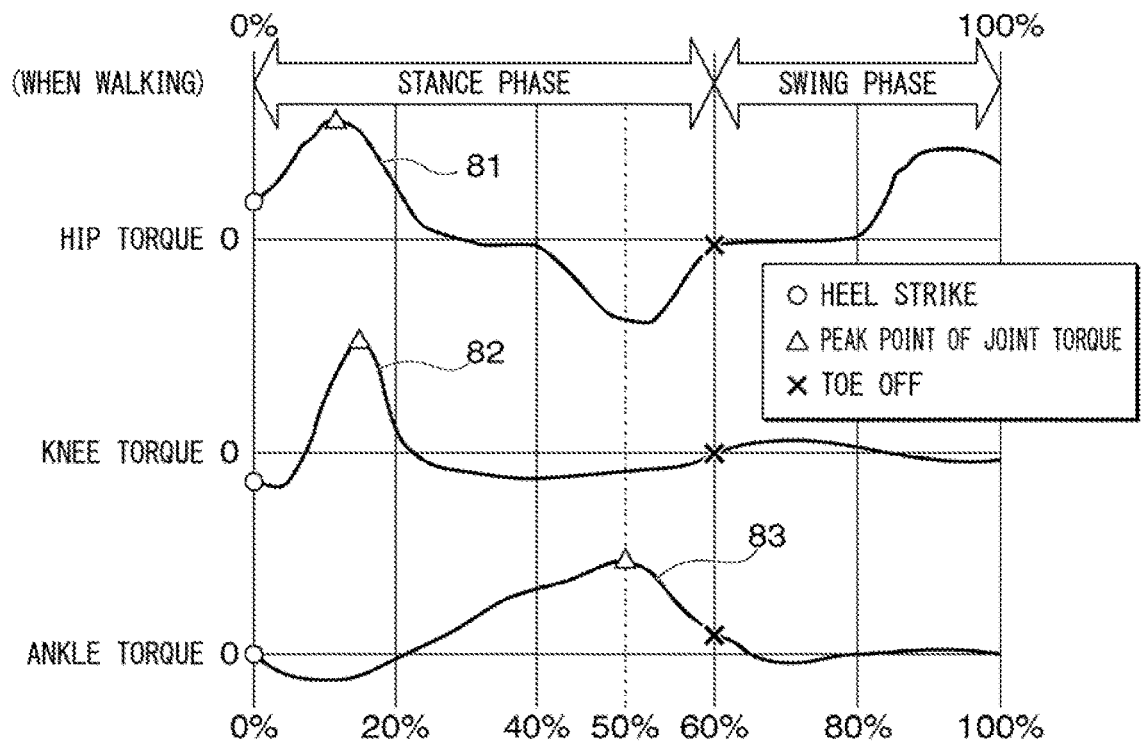
FIG. 7A is a graph showing an example of each characteristic in the gait cycle according to the embodiment of the present invention.
Figure 7B:
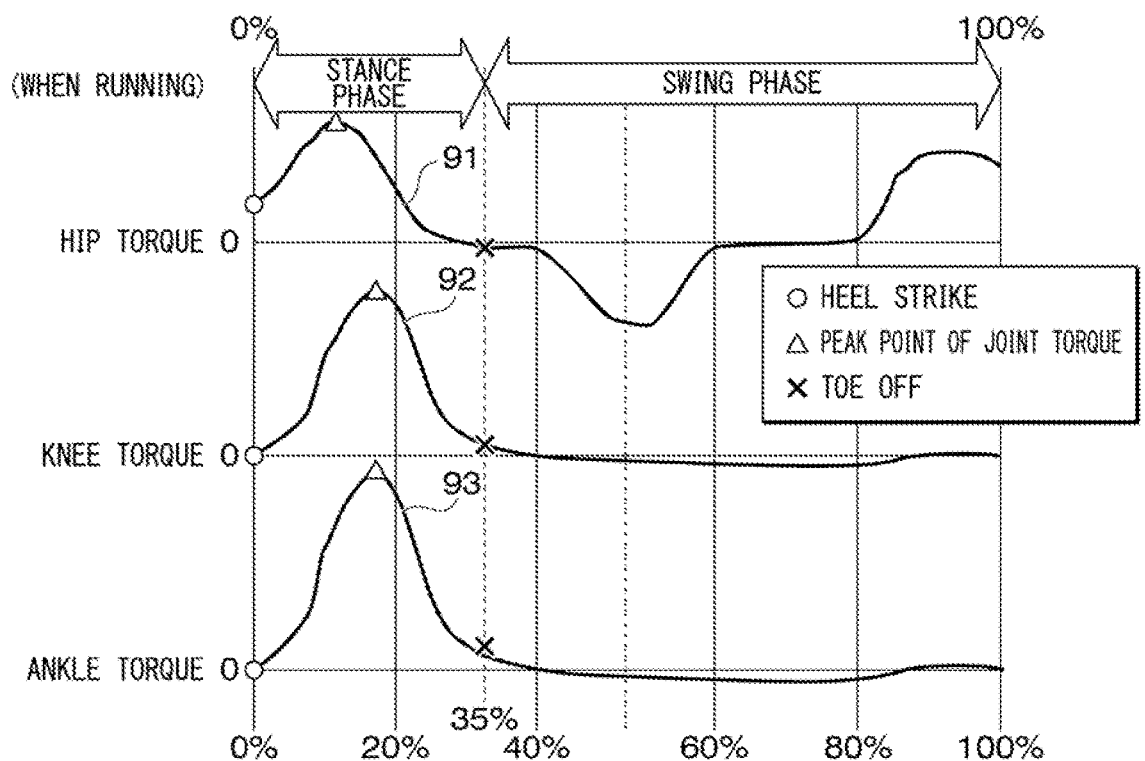
FIG. 7B is a graph showing an example of each characteristic in the gait cycle according to the embodiment of the present invention.

FIGS. 7A and 7B are graphs showing an example of each characteristic in the gait cycle.

In each graph shown in FIGS. 7A and 7B, the horizontal axis shows the percentage of time elapsed in one gait cycle. The upper row shows the transition of hip joint torque. The middle row shows the transition of knee joint torque. The lower row shows the transition of ankle torque. The symbol "○" indicates heel strike. The symbol "△" indicates the peak point of joint torque. The symbol "×" indicates toe off.

FIG. 7A shows the transition of each joint torque during walking.

The solid line 81 shown in the upper row shows the transition of hip joint torque. The solid line 82 shown in the middle row shows the transition of the knee joint torque. The solid line 83 shown in the lower row shows the transition of the ankle joint torque. The start time in the unit period of the gait cycle during walking is 0% of the elapsed period in the cycle, and the end time in the unit period of the gait cycle is 100% of the elapsed duration in the cycle.

Then, the duration from 0% to about 60% in the gait cycle during walking is the stance phase in which the leg is being a stance. The stance period is the period from heel strike to toe off. In addition, the duration from about 60% to 100% in the gait cycle during walking is the swing phase in which the leg is being a swing. In the gait cycle during walking, the swing phase is the period from the toe off to the heel strike.

Also, in the gait cycle during walking, the heel strike occurs at the 0% point. In addition, in the gait cycle during walking, the toe off occurs at about the 60% point. In addition, the peaks of the hip joint torque and knee joint torque in the gait cycle during walking occur at points in the period from about 10% to about 20%. The peak of the ankle joint torque in the gait cycle during walking occurs at about the 50% point.

FIG. 7B shows the transition of each joint torque during running.

The solid line 91 shown in the upper row shows the transition of hip joint torque. The solid line 92 shown in the middle row shows the transition of knee joint torque. The solid line 93 shown in the lower row shows the transition of the ankle joint torque. The duration from 0% to about 35% in the gait cycle during running is the stance phase. The duration from about 35% to 100% in the gait cycle during running is the swing phase. The heel strike is at the 0% point in the gait cycle during running. The toe off is about the 35% point in the gait cycle during running. In addition, the peaks of the hip joint torque, knee joint torque, and ankle joint torque in the gait cycle during running occur at points in the period from about 10% to about 20%.

As shown in FIGS. 7A and 7B, the time ratio between the stance phase and the swing phase in the gait cycle differs between walking and running. For example, the time ratio from the heel strike to the toe off is about 60% when walking, and about 40% when running with respect to the time of the entire gait cycle. In addition, the peak time of each joint in the gait cycle differs between walking and running.

Therefore, the torque control unit 2122 compares a reference model corresponding to each motion with the extracted characteristics, and determines the user's motion based on the difference (Step ST3 in FIG. 6). For example, the torque control unit 2122 determines that the reference model having the smallest difference between the characteristics of the reference model and the extracted characteristics to be the user's motion.

Then, the torque control unit 2122 controls the output torque with a control pattern according to the determined motion (Step ST4). That is, the control device 21 stores a plurality of reference models in advance, specifies the reference model having the smallest difference, and acquires control parameters of the control pattern corresponding to the reference model from the storage unit 215 or the like. Then, the torque control unit 2122 sets the optimum control parameters according to the difference between the determined motion and the reference model. As described above, the parameters are a control system parameters for determining the response of the hip actuator 13, the knee actuator 14, or the ankle actuator 15, a threshold value for making a determination of a stance or a swing, and the like.

Then, the torque control unit 2122 calculates the target values of the torque output by the hip actuator 13, the knee actuator 14, and the ankle actuator 15 on the basis of the control parameters and algorithms corresponding to the determined motion. Specifically, the torque control unit 2122 calculates the target value of each torque using the sensing information indicating the current value acquired from at least one of the shoe sole load sensor 18, the foot sole load sensor 19, the hip joint sensor 23, the knee joint sensor 24, the ankle joint sensor 25, or the acceleration sensor 26, and the angle reference of each joint. The torque control unit 2122 outputs the calculated target values of torque of the hip actuator 13, the knee actuator 14, and the ankle actuator 15 of each leg to the actuator control unit 213.

The actuator control unit 213 controls the rotation angles of the hip actuator 13, the knee actuator 14, and the ankle actuator 15 with an angle controller $K_{ci}(s)$ on the basis of the target value of the torque. "s" indicates the frequency domain of the control system. Subsequently, the actuator control unit 213 causes the hip actuator 13, the knee actuator 14, and the ankle actuator 15 of each leg to output the torque i at the current timing by a force controller $K_{bi}(s)$.

Thereby, the interaction force $F_k$ between suits and person applied by the user, the applied torque $l_k$ applied by the user, and the output torque τ in the kth of the time series (current value) become the dynamics P(s) of each actuator. The hip joint sensor 23, the knee joint sensor 24, and the ankle joint sensor 25 detect each joint angle $θ_k$ in the kth of the time series in accordance with the dynamics G(s) of the powered suit 100 based on the dynamics P(s) of the hip actuator 13, the knee actuator 14, and the ankle actuator 15. Then, the control device 21 repeats the above-described processing.

Note that the actuator control unit 213 calculates the torque τ using the following torque calculation formula as an example. In this torque calculation formula (1), "f(θ)/G(s)" indicates a feedback factor to the actuator control unit 213. "$F_k·l_k$" indicates a feedforward factor. $T_i$ indicates the target value of the torque calculated by the torque control unit. f(θ) indicates a function including an angle θ based on the angle reference of the hip actuator 13, the knee actuator 14, and the ankle actuator 15. The torque calculation formula below is an example, and a formula other than the torque calculation formula shown below may be used. In the torque calculation formula (1), "s" indicates the frequency domain of the control system, $K_{bi}$ indicates the control model of the force controller, and $K_{ci}$ indicates the control model of the angle controller.

$$τ = K_{bi}(s)\{T_i·K_{ci}(s) - f(θ)/G(s) + F_k·l_k\} \quad (1)$$

Figure 8:
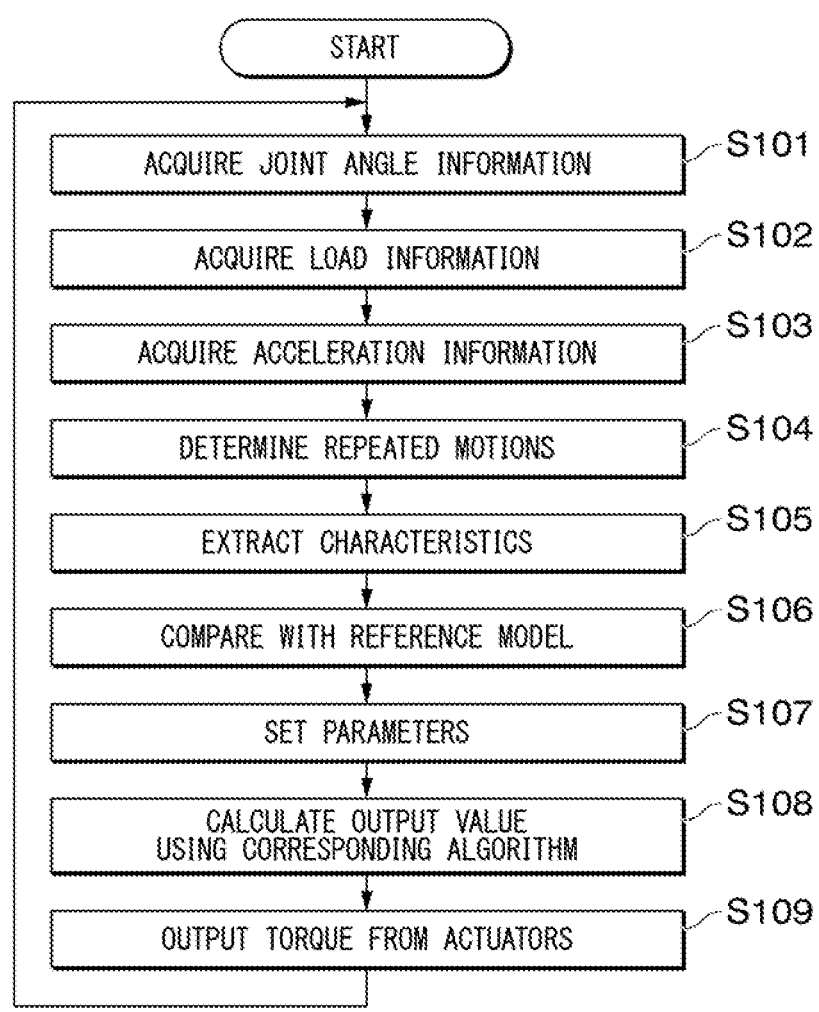
FIG. 8 is a flowchart showing processing of a powered suit according to the first embodiment.

FIG. 8 is a flowchart showing the processing of the powered suit according to the first embodiment.

First, the user wears the powered suit 100. At this time, the user inserts the foot sole load sensor 19 inside the foot harness 17. The foot sole load sensor 19 may be provided inside the foot harness 17 in advance. As the area of the foot sole load sensor 19, a size suitable for the size of the user's foot may be used. Further, the user attaches the shoe sole load sensor 18 to the ground contact surface side of the foot harness 17 or the shoe sole plate 16 of the powered suit 100. The shoe sole load sensor 18 may also be provided in advance on the ground contact surface side of the foot harness 17 or the shoe sole plate 16. As the area of the shoe sole load sensor 18, a size suitable for the foot harness 17 corresponding to the size of the user's foot may be used.

The user operates the power button of the control device 21 provided in the powered suit 100 to turn on the power. As a result, the control device 21 is started. The user performs motions such as walking, running, leaping, and jumping while wearing the powered suit 100. The user may load luggage on the loading platform 20 of the powered suit 100 and perform motions such as walking, running, leaping, and jumping. The actuator control unit 213 of the control device 21 controls the hip actuator 13, the knee actuator 14, and the ankle actuator 15 so as to reduce the load on the user due to the weight of the luggage or the powered suit 100. As a result, the powered suit 100 unloads the weight of the luggage and the weight of the powered suit 100 on the user, and also assists walking.

While the control device 21 is being driven, the information acquisition unit 211 acquires joint angle information from the hip joint sensor 23, the knee joint sensor 24, and the ankle joint sensor 25 at predetermined intervals (Step S101). Further, while the control device 21 is being driven, the information acquisition unit 211 acquires load information from the shoe sole load sensor 18 and the foot sole load sensor 19 at predetermined intervals (Step S102). In addition, while the control device 21 is being driven, the information acquisition unit 211 acquires acceleration information from the acceleration sensor 26 at a predetermined interval (Step S103). The predetermined interval is, for example, every short time such as every 10 milliseconds.

The determination unit 2121 determines the gait cycle as a repeated motion based on the joint angle information, the load information, and the acceleration information acquired by the information acquisition unit 211 (Step S104), and generates gait cycle data. The torque control unit 2122 performs machine learning such as convolution processing and weighting processing on the gait cycle data of multiple periods using a characteristic extraction model based on a convolutional neural network, and extracts the characteristics (Step S105).

The torque control unit 2122 compares the extracted characteristics with the characteristics of the reference model (Step S106). As described above, in the reference model, the characteristics thereof are associated with the parameters and the algorithm. The torque control unit 2122 specifies a reference model in which the difference between the extracted characteristics and the characteristics of the reference model is small, based on the result of the comparison. The torque control unit 2122 determines the motion based on the specified reference model and sets the parameters (Step S107). The torque control unit 2122 calculates the output value of the output torque using an algorithm corresponding to the determined motion (Step S108).

The actuator control unit 213 causes the hip actuator 13, the knee actuator 14, and the ankle actuator 15 of each leg to output the torque of the calculated output value (Step S109). After that, the process returns to the process of Step S101, and the control device 21 repeats the processes from steps S101 to S109 until the process is completed.

According to the above processing, the accurate required torque for each joint to support the load is calculated, so as to being capable of outputting by the hip actuator 13, the knee actuator 14, and the ankle actuator 15. For this reason, even if the user's motion pattern fluctuates significantly from low response to high response, such as a slow walking motion or an agile motion of running, the user's motion can always be tracked, and it is possible to realize assistance for reducing the load in a timely and appropriate manner for each motion.

For example, since the torque control unit 2122 extracts a characteristic in the repeated motion and compares the characteristic with the reference model, the output torque can be controlled by the control pattern according to the user's motion. Therefore, since it is possible to control the output of the hip actuator 13, the knee actuator 14, and the ankle actuator 15 by adaptively predicting the user's motion, load reduction is possible for various motion patterns of the user. Further, the torque control unit 2122, using a characteristic extraction model based on a convolutional neural network, performs machine learning such as convolution processing and weighting processing, extracts a characteristic, and compares the characteristic with the reference model. Therefore, by clarifying the difference from the reference, it is possible to provide the optimum load reduction to each user.

Further, when a different device from the powered suit 100 performs the above processing, the real-time property may be impaired due to the delay in data transmission/reception, but in the present embodiment, the control device 21 included in the powered suit 100 performs the above process. For this reason, it is possible to respond to a sudden motion of the user without delay.

Further, the above-mentioned processing is executed on the basis of the sensing information detected by the shoe sole load sensor 18, the foot sole load sensor 19, the hip joint sensor 23, the knee joint sensor 24, the ankle joint sensor 25, and the acceleration sensor 26 included in the powered suit 100 attached to the lower limbs. For this reason, even when for example there is a discrepancy between the motions of the upper limbs and the lower limbs, it is possible to provide appropriate load reduction. Moreover, since the powered suit 100 has a relatively simple structure of being attached to the lower limbs, it can be easily attached and detached.

Although the first embodiment of the present invention has been described above, the present invention is not limited to the above-described embodiment, and various modifications can be made within a scope not departing from the spirit of the present invention.

For example, the shoe sole load sensor 18 may be provided in advance on a side of the ground contact surface of the shoe sole plate 16 of the powered suit 100. Further, the foot sole load sensor 19 may be inserted in advance inside the foot harness 17.

Further, in the above description, it was shown that the shoe sole load sensor 18 has an area that covers the entire back surface of the foot harness 17, and the foot sole load sensor 19 has an area that covers the entire sole in the inner part of the foot harness 17. However, the shoe sole load sensor 18 may be capable of measuring the load applied to the ground contact surface from the shoe sole plate 16 or the foot harness 17 even when the position where the load is applied deviates.

Further, in the above description, the case of controlling the powered suit 100 was illustrated, but the control device 21 is not limited thereto, and can be applied to general control of a multi joint robot or the like (for example, a humanoid robot) having a non-linear mode transition.

Further, in the above example, the control device 21 is provided in the powered suit 100, but the present invention is not limited thereto, and another device that is communicatively connected with the powered suit 100 by wires or wirelessly may have the function of the control device 21.

Second Embodiment

Figure 9:
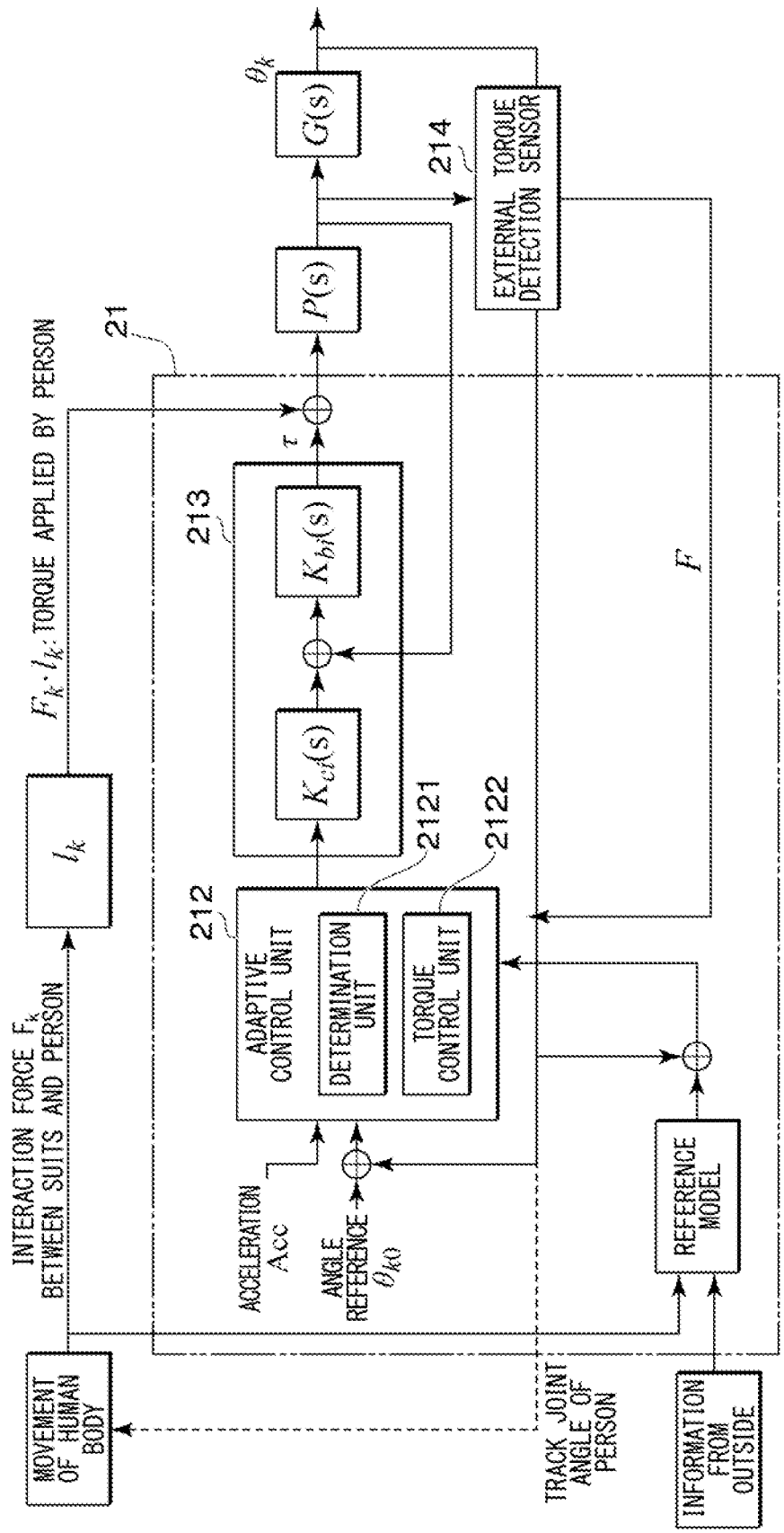
FIG. 9 is an operation block diagram showing the operation of the control device according to the second embodiment.

FIG. 9 is an operation block diagram showing the operation of the control device according to the second embodiment.

The control device 21 according to the second embodiment further detects the external torque F received from the outside by each sensor, and further uses the external torque F to control the output torque output by the hip actuator 13, the knee actuator 14, and the ankle actuator 15. The external torque F is, for example, a torque value obtained by detecting the force received by the powered suit 100 from the outside by each sensor based on the landing impact, the dynamic acceleration, the deviation between the movement of the powered suit 100 and the user, and the like.

Here, in the second embodiment, each of the hip joint sensor 23, the knee joint sensor 24, and the ankle joint sensor 25 is provided with an external torque detection sensor 214 for detecting the external torque F. Then, the information acquisition unit 211 further acquires the external torque F from the external torque detection sensors 214 of each of the hip joint sensor 23, the knee joint sensor 24, and the ankle joint sensor 25.

For example, the external torque detection sensor 214 detects the value of the external torque F according to the amount of change by which the angle between the links rotatably attached, with reference to the joint to which each joint sensor is attached, has changed due to an external force. The amount of change may be the difference between the angle instructed by the actuator control unit 213 and the angle when the change is momentarily caused by a force obtained from the outside. The external torque detection sensor 214 may calculate the amount of change by which the angle between the links rotatably attached based on the joint has momentarily changed due to an external force, from the difference in the distance at any position on those links rather than the difference between the angles.

Figure 10:
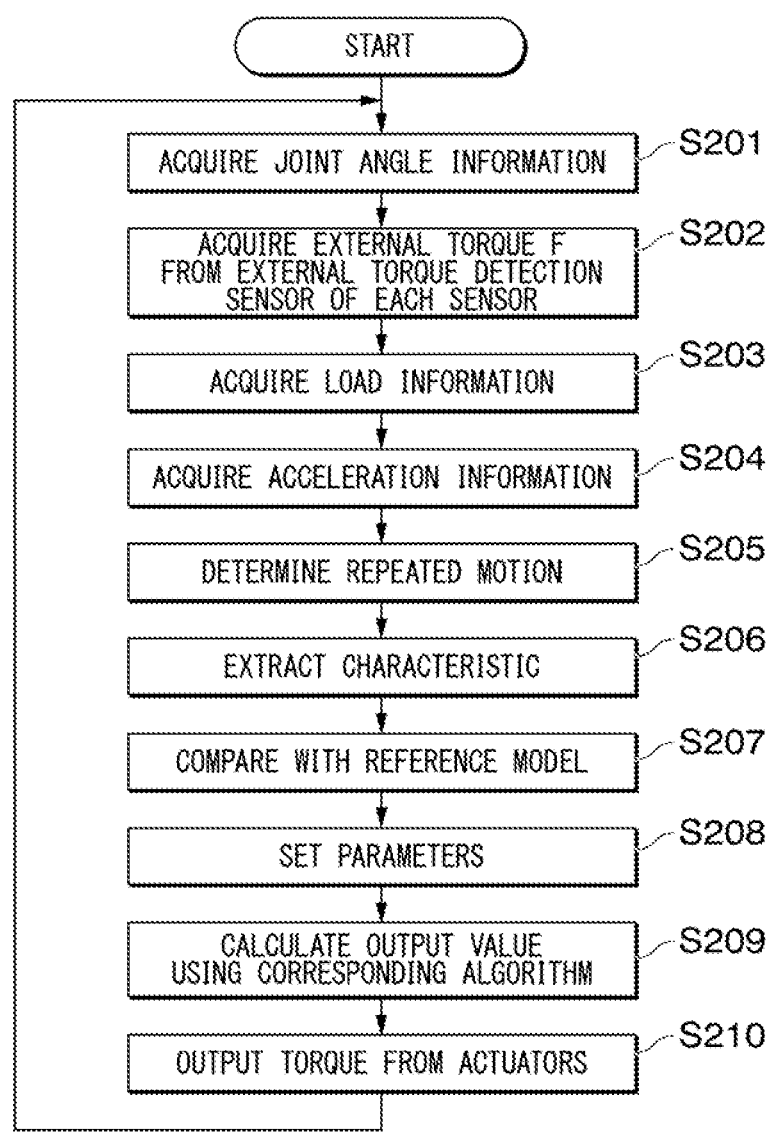
FIG. 10 is a flowchart showing processing of a powered suit according to the second embodiment.

FIG. 10 is a second flowchart showing the processing of the powered suit according to the second embodiment.

While the control device 21 is being driven, the information acquisition unit 211 acquires joint angle information from the hip joint sensor 23, the knee joint sensor 24, and the ankle joint sensor 25 at predetermined intervals (Step S201), and acquires the external torque F from the external torque detection sensor 214 of each sensor (Step S202). While the control device 21 is being driven, the information acquisition unit 211 acquires load information from the shoe sole load sensor 18 and the foot sole load sensor 19 at predetermined intervals (Step S203). While the control device 21 is being driven, the information acquisition unit 211 acquires acceleration information from the acceleration sensor 26 at a predetermined interval (Step S204). The predetermined interval is, for example, every short time such as every 10 milliseconds.

The determination unit 2121 determines the gait cycle as a repeated motion based on the joint angle information, the external torque F, the load information, and the acceleration information acquired by the information acquisition unit 211 (Step S205), and generates gait cycle data. The torque control unit 2122 performs machine learning such as convolution processing and weighting processing on the gait cycle data of multiple cycles using a characteristic extraction model based on a convolutional neural network, and extracts the characteristics (Step S206).

The torque control unit 2122 compares the extracted characteristics with the characteristics of the reference model (Step S207). The torque control unit 2122 specifies a reference model in which the difference between the extracted characteristics and the characteristics of the reference model is small, based on the result of comparison. The torque control unit 2122 determines the motion based on the specified reference model and sets parameters (Step S208).

The torque control unit 2122 calculates the output value of the output torque using an algorithm corresponding to the determined motion (Step S209). The torque control unit 2122 calculates the output value of the output torque that cancels the acquired external torque F in the calculation of the output value of the output torque. As a result, the output value of the output torque calculated by the torque control unit 2122 becomes a value that tracks the actual torque including the dynamic element.

The actuator control unit 213 outputs the torque of the output value calculated from the hip actuator 13, the knee actuator 14, and the ankle actuator 15 of each leg (Step S210). After that, the process returns to the process of Step S201, and the control device 21 repeats the processes from steps S201 to S210 until the process is completed.

The above-mentioned processing of the torque control unit is an example of a mode of calculating the output value of the torque of the drive mechanism of each sensor or the like that cancels the external torque F and controlling the drive mechanism based on the output value.

In the above process, the torque control unit 2122 calculates the deviation between the characteristics of the gait cycle calculated by machine learning and the characteristics of the reference model. When the deviation of the timing at which the characteristics appear is less than a threshold value, the torque control unit 2122 in Step S207 determines the motion and sets the parameters based on the relationship between the torque and the time indicated by the reference model.

On the other hand, when the deviation of the timing at which the characteristics appear is equal to or greater than the threshold value, the torque control unit 2122 performs the following processing. That is, the torque control unit 2122 calculates the reference model after a period change, in which the period indicated by the relationship between the torque and the time of the gait cycle indicated by the reference model is shifted so that the timing of the characteristics of the reference model matches the characteristics of the gait cycle calculated by machine learning. Then, in Step S207, the torque control unit 2122 determines the motion and sets the parameters based on the relationship between the torque and the time indicated by the reference model after the period change. Thereby, the timing of the stance phase and the swing phase indicated by the reference model can be matched with the stance phase and the swing phase of the user's gait.

The processing of this torque control unit is one aspect of a process that, based on the deviation between the characteristics extracted on the basis of machine learning of a repeated motion and the characteristics of the reference model, corrects the period indicated by the relationship between the torque and time in the reference model so that the deviation is reduced, and specifies the timing of the repeated motion based on the reference model.

If the timing of the stance phase and the swing phase indicated by the reference model can be matched with the stance phase and the swing phase of the user's walk, it is possible to determine the period of the walking without detecting the start of the walking step on the basis of whether or not the acceleration exceeds a predetermined threshold value. That is, in this case, the acceleration sensor 26 becomes unnecessary.

Figure 11:
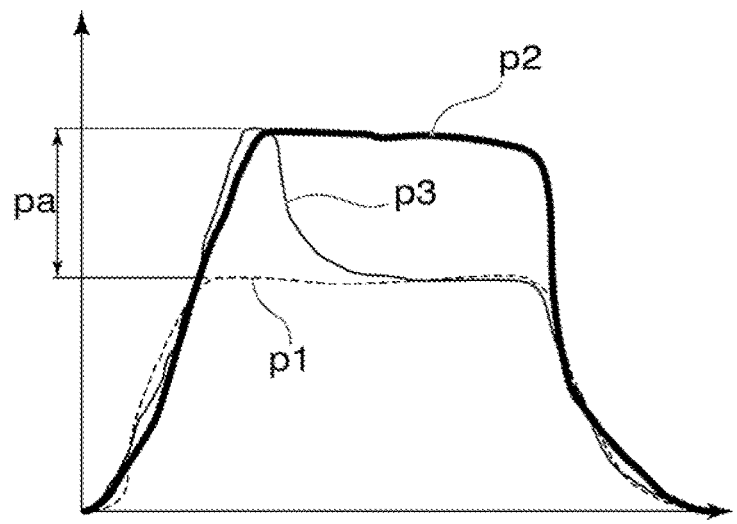
FIG. 11 is a graph showing the relationship between the output of the torque control unit and the target torque when the control according to the second embodiment is not performed.

FIG. 11 is a graph showing the relationship between the output of the torque control unit 2122 and the target torque when the control according to the second embodiment is not performed.

Figure 12:
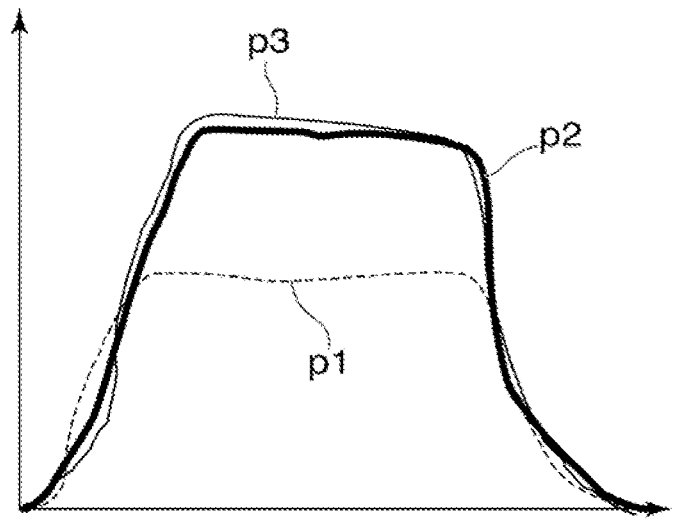
FIG. 12 is a graph showing the relationship between the output of the torque control unit and the target torque when the control according to the second embodiment is performed.

FIG. 12 is a graph showing the relationship between the output of the torque control unit 2122 and the target torque when the control according to the second embodiment is performed.

As described above, when the external torque F is not considered, that is, the dynamically generated external torque F is not considered. For this reason, the torque control unit 2122 calculates an output value that matches the torque according to the time transition indicated by the target torque p1 based on a static element.

On the other hand, when the external torque F is taken into consideration, the dynamically generated torque is taken into consideration. Therefore, the torque control unit 2122 calculates an output value that matches the torque according to the time transition indicated by the target torque p2 based on the dynamic element.

Here, the output p3 of the torque control unit 2122 will be described when the torque control unit 2122 matches the torque corresponding to the time transition indicated by the target torque p1 based on the static element. Although the output p3 of the torque control unit 2122 is the torque generated at each joint due to the influence of the external torque F, that torque transitions so as to approach the target torque p1 under the control of the torque control unit 2122 (p3).

However, the torque value corresponding to the time indicated by the output value p3 imposes a burden of the torque difference indicated as the value pa on the user at the initial stage when the output value p3 does not match the target torque p1 (FIG. 11). On the other hand, the torque control unit 2122 calculates the output value p3 so as to match the target torque p2 (FIG. 12), so that the burden on the user can be reduced.

Figure 13:
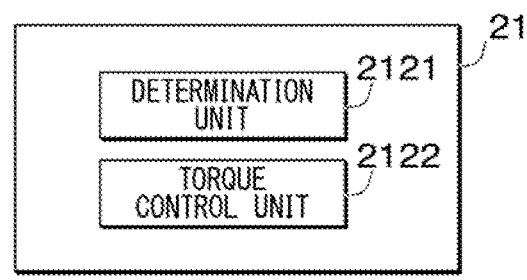
FIG. 13 is a diagram showing a minimum configuration of a control device according to an embodiment of the present invention.

FIG. 13 is a diagram showing the minimum configuration of the control device.

The control device 21 as one aspect of the load reduction device may have at least the functions of the determination unit 2121 and the torque control unit 2122 described above.

The determination unit 2121 determines repeated motions by a user.

The torque control unit 2122 extracts characteristics in repeated motions by the convolution process and compares them with the reference model of each motion. As a result, the torque control unit 2122 controls the torque output by the hip actuator 13, the knee actuator 14, and the ankle actuator 15 in order to reduce the load exerted to the user at the joints of the user's legs.

The above-mentioned control device may also be a computer provided with hardware such as the CPU (Central Processing Unit) 101, the ROM (Read Only Memory) 102, the RAM (Random Access Memory) 103, an HDD (Hard Disk Drive) 104, and the wireless communication device 105.

The control device described above has a computer system inside. The process of each processing described above is stored in a computer-readable recording medium in the form of a program, with the process being performed by the computer reading and executing this program. Here, the computer-readable recording medium refers to a magnetic disk, a magneto-optical disk, a CD-ROM, a DVD-ROM, a semiconductor memory, or the like. Further, this computer program may be distributed to a computer via a communication line, and the computer receiving the distribution may execute the program.

Further, the above-mentioned program may be for realizing some of the functions described above.

Moreover, the above-mentioned program may be a so-called differential file (differential program) that can realize the above-mentioned functions in combination with a program already recorded in the computer system.

Priority is claimed on Japanese Patent Application No. 2018-215838, filed Nov. 16, 2018, and Japanese Patent Application No. 2019-151162, filed Aug. 21, 2019, the content of which is incorporated herein by reference.

INDUSTRIAL APPLICABILITY

According to the present invention, it is possible to provide a load reduction device capable of more appropriate load reduction with respect to a user's motions.

REFERENCE SIGNS LIST

- 100: Powered suit
- 11: Skeleton portion
- 12: Belt
- 13: Hip actuator
- 14: Knee actuator
- 15: Ankle actuator
- 16: Shoe sole plate
- 17: Foot harness
- 18: Shoe sole load sensor
- 19: Foot sole load sensor
- 20: Loading platform
- 21: Control device
- 22: Battery
- 23: Hip joint sensor
- 24: Knee joint sensor
- 25: Ankle joint sensor
- 26: Acceleration sensor
- 211: Information acquisition unit
- 212: Adaptive control unit
- 214: External torque detection sensor
- 2121: Determination unit
- 2122: Torque control unit
- 213: Actuator control unit
- 214: Power supply unit
- 215: Storage unit

What is claimed is:

1. A load reduction device comprising:
at least one memory storing instructions; and
at least one processor configured to execute the instructions to:
determine a repeated motion that is repeated by a user; and
control, by comparing a characteristic extracted on the basis of machine learning for the repeated motion and a characteristic of a reference model, torque output by a drive mechanism to reduce a load on the user at a joint of a leg of the user,
wherein the at least one processor is configured to execute the instructions to, in controlling the torque output by the drive mechanism, correct a period indicated by a relationship between the torque and time in the reference model, based on a deviation between the characteristic extracted based on the machine learning for the repeated motion and the characteristic of the reference model, and specify a timing of the repeated motion on the basis of the reference model.

2. The load reduction device according to claim 1, wherein the at least one processor is configured to execute the instructions to:
determine a start to an end of one step as the repeated motion; and
extract a timing of heel strike and toe off as the characteristic.

3. The load reduction device according to claim 1, wherein the at least one processor is configured to execute the instructions to:
extract a peak of the torque output by the drive mechanism as the characteristic.

4. The load reduction device according to claim 1, wherein the at least one processor is configured to execute the instructions to:
determine the repeated motion on the basis of acceleration applied to the user.

5. The load reduction device according to claim 1, wherein
the reference model associates the characteristic corresponding to each the repeated motion with a control pattern of the torque output by the drive mechanism.

6. The load reduction device according to claim 1, wherein the at least one processor is configured to execute the instructions to:
calculate an output value of the torque of the drive mechanism that cancels an external torque indicating torque applied from the outside, and control the drive mechanism based on the output value.

7. A load reduction method comprising:
determining a repeated motion that is repeated by a user; and
controlling, by comparing a characteristic extracted on the basis of machine learning for the repeated motion and a characteristic of a reference model, torque output by a drive mechanism to reduce a load on the user at a joint of a leg of the user,
wherein controlling the torque output by the drive mechanism includes correcting a period indicated by a relationship between the torque and time in the reference model, based on a deviation between the characteristic extracted based on the machine learning for the repeated motion and the characteristic of the reference model, and specifying a timing of the repeated motion on the basis of the reference model.

8. A non-transitory computer-readable storage medium that stores a program executable a computer of a load reduction device to perform processing comprising:
determining a repeated motion that is repeated by a user; and
controlling, by comparing a characteristic extracted on the basis of machine learning for the repeated motion and a characteristic of a reference model, torque output by a drive mechanism to reduce a load on the user at a joint of a leg of the user,
wherein controlling the torque output by the drive mechanism includes correcting a period indicated by a relationship between the torque and time in the reference model, based on a deviation between the characteristic extracted based on the machine learning for the repeated motion and the characteristic of the reference model, and specifying a timing of the repeated motion on the basis of the reference model.

* * * * *